United States Patent [19]

Hanning

[11] 4,064,208
[45] Dec. 20, 1977

[54] MOLDING METHOD WITH AUTOMATIC FLUID TREATMENT OF MOLD CAVITY

[75] Inventor: Michael Hanning, Oerlinghausen, Germany

[73] Assignee: Hanning-Elektro-Werke Robert Hanning, Bielefeld, Germany

[21] Appl. No.: 687,340

[22] Filed: May 17, 1976

Related U.S. Application Data

[62] Division of Ser. No. 568,735, April 16, 1975, Pat. No. 4,009,978.

[30] Foreign Application Priority Data

Apr. 18, 1974 Germany .............................. 2418658

[51] Int. Cl.² ............................ B29F 1/14; B29C 1/04
[52] U.S. Cl. ......................................... 264/39; 264/85; 264/334; 264/338
[58] Field of Search .................... 264/39, 85, 338, 334

[56] References Cited

U.S. PATENT DOCUMENTS

| | | | |
|---|---|---|---|
| 2,929,105 | 3/1960 | Starck | 425/437 |
| 3,645,319 | 2/1972 | Pondelicek | 264/39 X |
| 3,671,159 | 6/1972 | Greenberg | 425/437 X |
| 3,805,875 | 4/1974 | Daugherty | 425/437 X |

*Primary Examiner*—Richard R. Kucia
*Attorney, Agent, or Firm*—Karl F. Ross

[57] ABSTRACT

Two mold halves together form a mold cavity and one of the mold halves is fitted with a plurality of ejector rods that can be reciprocated so as to push a molded article out of that half. At least some of these ejector rods are formed with throughgoing passages terminating adjacent the inner ends thereof at nozzle openings. Air and a treatment fluid, such as a demolding liquid, can be injected into the mold interior through these rods, the nozzle openings in the ends of the rods being covered during the normal molding operation.

2 Claims, 4 Drawing Figures

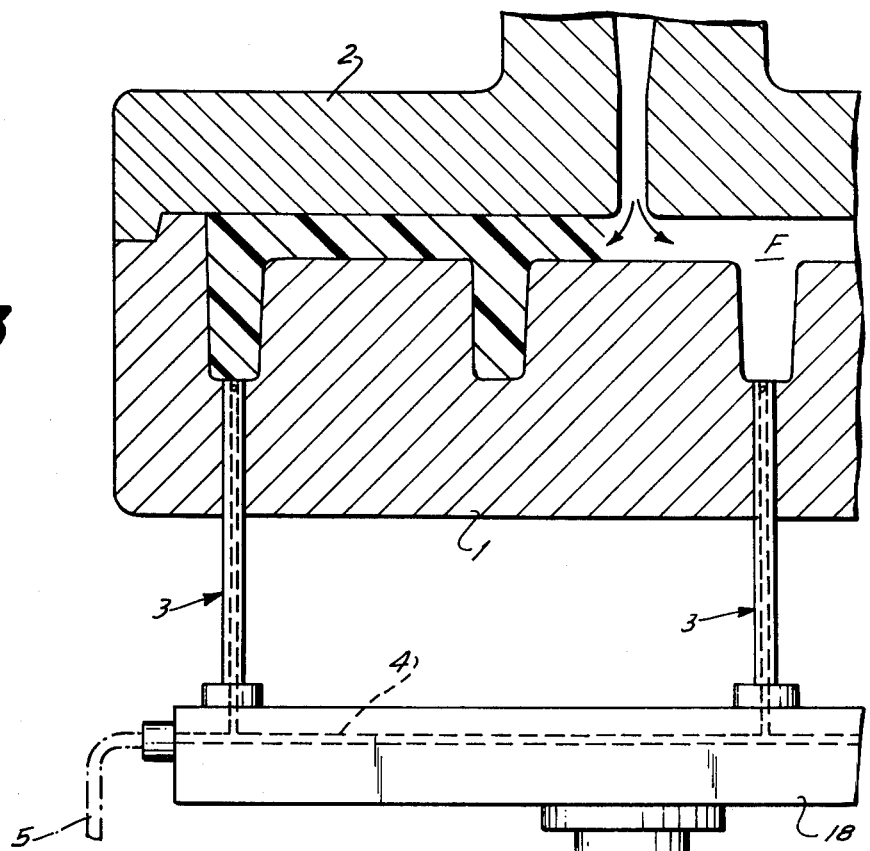
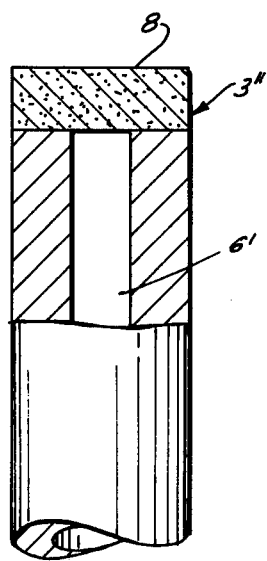
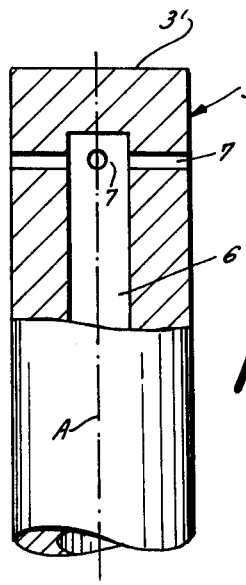
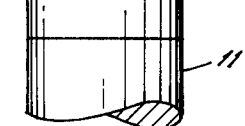
FIG. 3
FIG. 4
FIG. 2

MOLDING METHOD WITH AUTOMATIC FLUID TREATMENT OF MOLD CAVITY

This is a division of application Ser. No. 568,735 filed Apr. 16, 1975, now U.S. Pat. No. 4,009,978.

FIELD OF THE INVENTION

The present invention relates to a molding method and, more particularly, to the injection molding of synthetic-resin articles.

BACKGROUND OF THE INVENTION

A synthetic-resin article is usually cast in a mold constituted of a pair of mold halves together forming a mold cavity. A liquid synthetic-resin mass is injected into this cavity and is hardened therein. Thereupon the two mold halves are separated and ejector or knockout rods fitted in one of the mold halves are advanced so as to free the molded article from the mold. Typically one of the mold halves is substantially more intricately shaped than the other so that the molded article on separation of the two mold halves can be relied on to remain in this half, which is also usually the lower mold half and which is provided with the ejector rod or rods.

Between each molding operation it is frequently the practice to spray the interior of the mold with a release agent or similar treatment fluid. This is usually carried out by the operator of the molding device who manually sprays the interior by means of a spray head carried on a hose connected to a source of fluid. This spray head is directed at the surfaces to be treated while a valve is actuated to propel the fluid with gas pressure from the end of the head.

Such an arrangement has the considerable disadvantage that it requires the operator visually to gauge just how much of the treatment fluid is applied. In addition the operator must usually place his hand between the mold halves, creating the possibility of serious injury to him.

It has also been suggested to provide automatic devices which swing in between the separated mold halves after ejection of the molded article and automatically spray a dosed quantity of treatment liquid into the mold cavity. Such arrangements are relatively complicated and quite expensive. Also they rarely supply a sufficient amount of treatment liquid to the upper mold half. Such automatic devices are necessary however when the treatment fluid includes a noxious element, as is particularly the case with polytetrafluoroethylene emulsions, lacquers, posttreatment agents, and pretreatment agents.

OBJECTS OF THE INVENTION

It is therefore an object of the present invention to provide an improved molding method.

Another object is the provision of an improved method for applying a fluid treatment agent to the interior of a mold cavity.

Yet another object is the provision of such a system which is relatively inexpensive and which automatically applies an even coating to the entire interior of the mold cavity, i.e. to the upper and lower mold halves.

SUMMARY OF THE INVENTION

These objects are attained according to the present invention in an apparatus wherein the ejector element is formed with a longitudinally throughgoing passage extending between its inner and outer ends. A source of treatment fluid is connected at the outer end of the passage so that a portion of the treatment fluid can be injected into the cavity in the position of the element wherein its inner end penetrates within the mold cavity. Thus after molding and ejection of a molded article and before withdrawal of the ejector element to a position with its end face flush with the inner wall of the mold cavity, the treatment liquid is sprayed into the mold cavity so as evenly and automatically to coat all its interior surfaces.

According to another feature of this invention the ejector element has an end face and is formed with a nozzle which is connected with the passage and which lies adjacent (i.e. flush with) the end face so that this nozzle is recessed in the mold half during the molding operation. This prevents any of the synthetic-resin mass of which the article is formed from entering into this nozzle and blocking it. A plurality of such laterally open nozzles may be provided in order evenly to coat the entire interior of the mold cavity. It is also possible according to the present invention to form each of these ejector elements with a sintered metal head or a sintered-metal portion through which the fluid is ejected.

Thus in accordance with the present invention it is possible to replace one or all of the ejector rods of a conventional molding apparatus with ejector rods having nozzles and throughgoing passages according to the present invention. Then these ejector rods are used to coat the interior of the mold, being automatically controlled so as to emit a spray after the molded article has been removed from the mold and before the injection mold refills the mold cavity with a mass of synthetic resin. A particular advantage of the invention is that the treatment fluid is applied at those areas most likely to benefit from the coating, as the knockout or ejector rods are traditionally provided at the deepest parts of the lower mold half.

Furthermore the device according to the present invention, by using the ejector rod or rods also as a spraying device, not only simplifies the molding apparatus but also achieves better results. This is due in part to the fact that the extended or advanced ejector rods are themselves coated with the treatment fluid, usually a release agent such as a polytetrafluoroethylene emulsion. The injection of the usually cool or room-temperature treatment fluid through the ejector rod or pins helps in the cooling of the mold which must be at a temperature low enough to insure proper hardening of the synthetic-resin mass. This increased cooling capacity allows faster cycling of the press and produces better molded articles.

It also lies in the scope of the present invention to blow water or hot air into the mold cavity through the ejector rods. This is done simultaneously as the ejector rods are pushed into the mold cavity to push out a molded workpiece so as to eliminate the possibility that a low-pressure zone created under the workpiece holds it in the mold half. This type of ejection eliminates the formation of so-called white spots on the finished molded article. It is also within the scope of the invention to spray the treatment agent into the mold cavity before the workpiece or molded article is entirely pushed therefrom.

BRIEF DESCRIPTION OF THE DRAWING

The above and other objects, features, and advantages of the invention will become more readily apparent from the following description, reference being made to the accompanying drawing in which:

FIG. 2 is a large-scale partly broken away view illustrating the end of an ejector rod according to this invention;

FIG. 3 is a view similar to that of FIG. 1 illustrating the apparatus in another position;

FIG. 4 is a view similar to FIG. 2 illustrating another ejector rod according to this invention.

SPECIFIC DESCRIPTION

Figure 1:
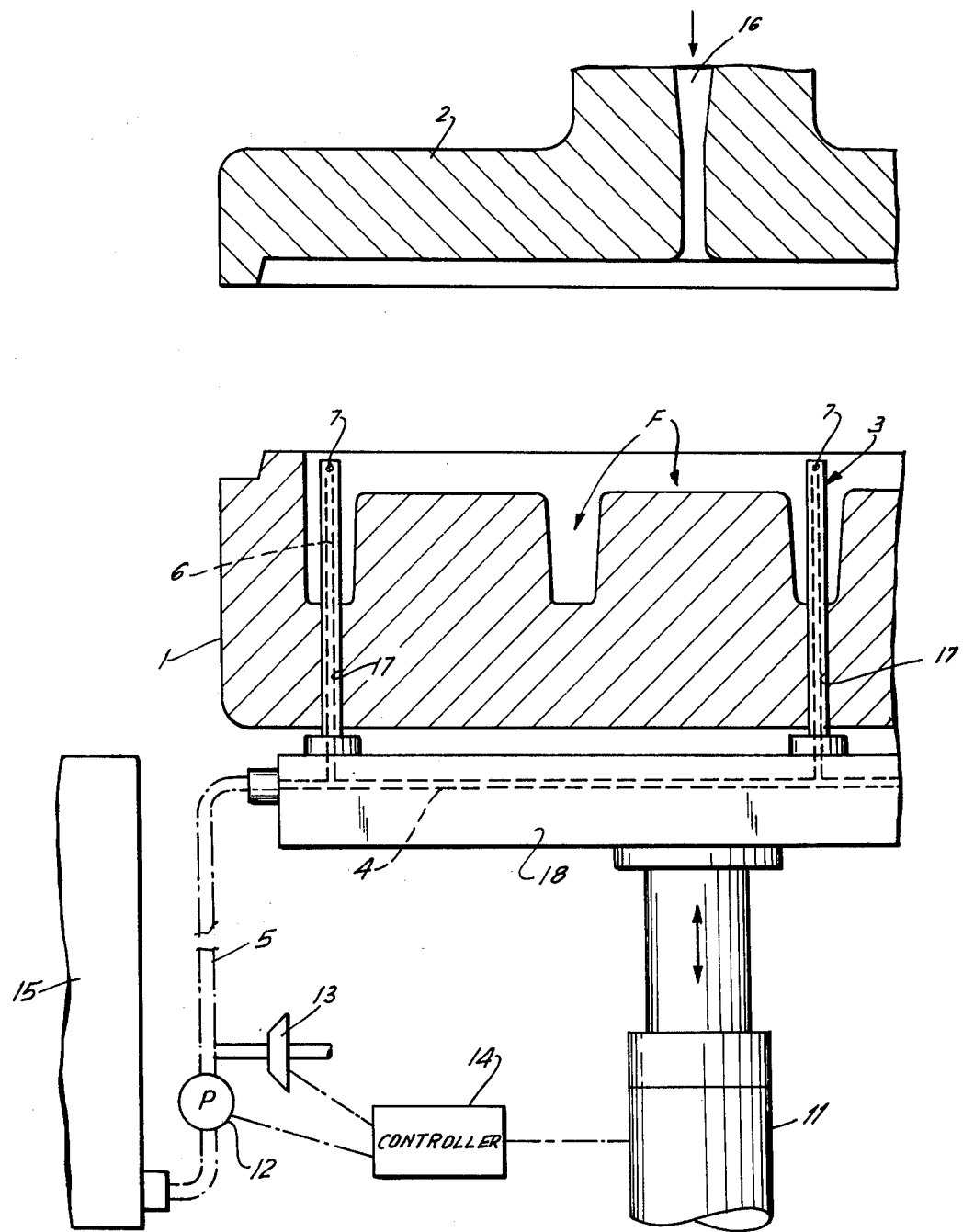
FIG. 1 is vertically sectional and partly shcematic view of an apparatus according to the present invention.

As shown in FIGS. 1–3 the apparatus according to the present invention basically comprises a mold having a lower half 1 and an upper half 2 together forming a mold cavity F. The lower half 1 is fixed and is formed with a plurality of parallel and vertical bores 17 in each of which is received a respective ejector rod 3 mounted on a vertically displaceable support plate 18. A hydraulic cylinder 11 serves to vertically reciprocate the support plate 18 and another such cylinder 9 (FIG. 5) serves to vertically reciprocate the upper mold half 2.

As also shown in FIG. 2 each rod has an end face 3′ which is planar and perpendicular to the longitudinal axis A of the respective rod. In addition each rod is formed with a passage 6 terminating short of the end face 3′ and connected at its upper end to four angularly equispaced nozzle holes 7 opening at right angles to each other and to the axis A. These passages 6 are all connected to a manifold passage 4 in the plate 18, which passage 4 is in turn connected by a flexible hose 5 to a pump 12 and a compressor 13. Treatment fluid from a source 15 can be fed to the hose 5 by pump 12, or the blower 13 may be operated to blow aiw into the passages 4 and 6. A controller 14 is connected to the cylinders 9 and 11 and to the pump 12 and blower 13.

FIG. 4 shows an ejector rod 3″ whose passage 6′ terminates short of its end face which is formed by a disk 8 of sintered metal, here sintered copper beads. The pore size of this sintered-metal disk 8 is such that synthetic resin cannot wet and enter into it.

Figure 5:
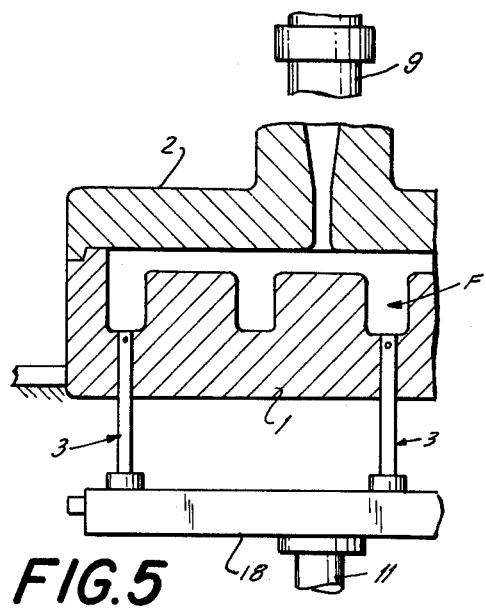
FIGS. 5–10 are small-scale sectionally schematic views illustrating the functioning of the apparatus according to the present invention.

The molding arrangement according to the present invention functions as follows:

To start with as shown in FIG. 5 two mold halves 1 and 2 are pressed tightly together by the cylinder 9 and the cylinder 11 is actuated to withdraw the support plate 18 so that the end faces 3′ of the ejector rods 3 lie flush with the inner surface of the cavity F.

Figure 6:
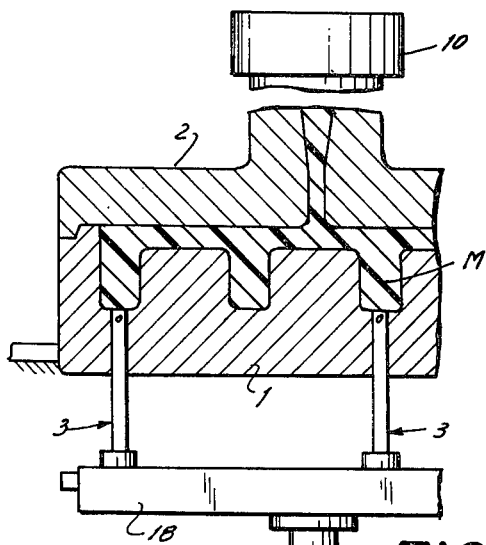

Thereafter as shown in FIG. 6 an extrusion apparatus 10 connected to a runner hole 16 of the upper mold half 2 fills the cavity F with a synthetic-resin mass M.

Figure 7:
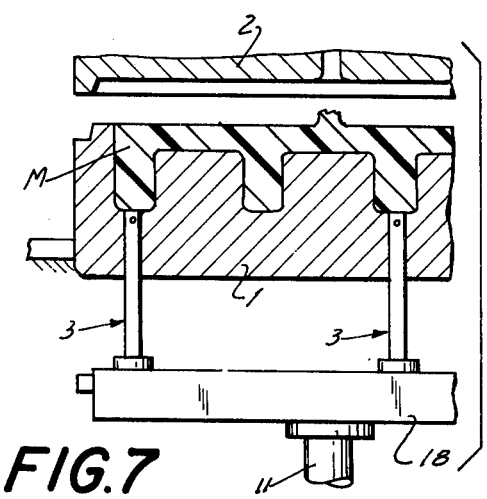

Once this mass is hardened the cylinder 9 is operated to lift the upper half 2 as shown in FIG. 7.

Figure 8:
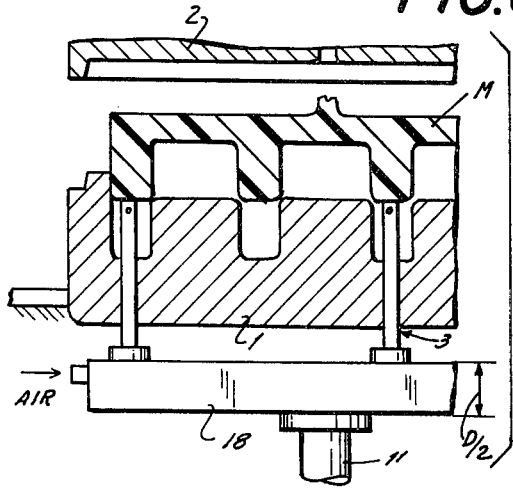
Figure 9:
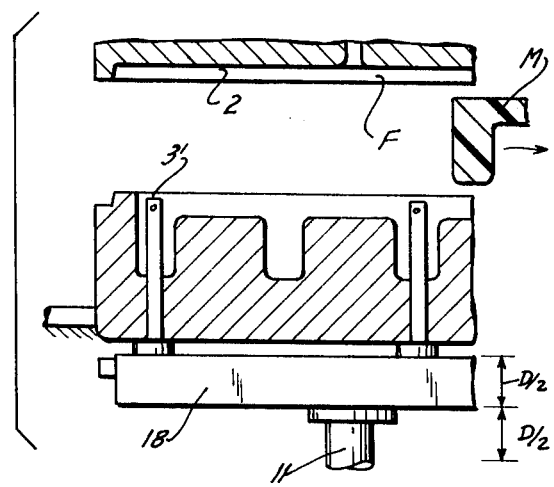

Thereafter as shown in FIG. 8 the cylinder 11 is actuated to raise the plate 18 by a distance D/2. Simultaneously the blower 13 is operated to inject air into the mold cavity F under the hardened mass M so as to free it from the lower mold half 1.

The mass M is subsequently removed from between the mold half 1 and 2 and the plate 18 is further lifted by another distance D/2 so that the ends 3′ thereof project well into the mold cavity F.

Figure 10:
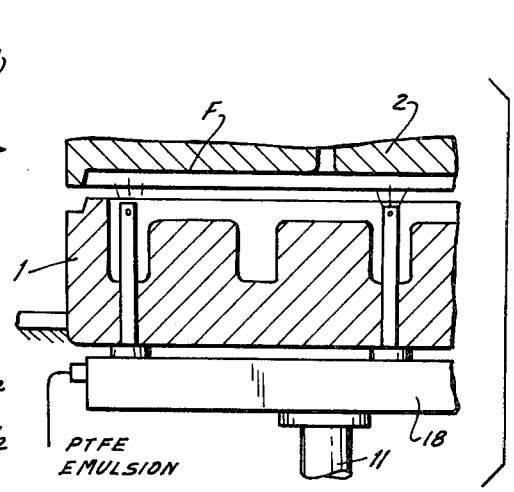

Finally as shown in FIG. 10 the cylinder 9 is operated to lower the upper mold half 2 either partially or entirely back to the lower half 1 and pump 12 is operated so as to spray the entire interior of the cavity F with a polytetrafluoroethylene emulsion. Thereafter the cylinder 11 is operated to withdraw the knockout rods 3 to the position shown in FIG. 5. The mold is then closed, if it has not already been closed, and the cycle described above is repeated.

I claim:

1. A method of molding a synthetic-resin article in a mold cavity defined between a pair of separable mold parts one of which is provided with ejector rods and which is connectable to a source of flowable synthetic-resin material, said method comprising the steps of:
   a. retracting the ejector rods from said mold cavity so that ends of said rods lie flush with a wall of said cavity in said one of said mold parts;
   b. injecting synthetic resin into said cavity while said mold parts are closed to form a synthetic-resin article having the shape of said mold cavity;
   c. separating said mold parts to permit discharge of said article therebetween;
   d. advancing said rods in said one of said mold parts toward the other of said mold parts whereby said ends of said rods eject said article;
   e. holding said ends of said ejector rods in spaced relation from walls of both of said mold parts adapted to form said cavity in a closed condition of the mold formed by said mold parts;
   f. spraying a mold-wall-treating release liquid from said ends of said ejector rods onto said walls of said mold parts by forcing said liquid through said ejector rods; and
   g. repeating steps (a) to (f) for the molding of successive articles.

2. The method defined in claim 1 wherein, upon ejection of each article, the mold parts are moved relatively together into an at least partially closed position prior to spraying in step (f).

* * * * *